United States Patent
Gassi (10) Patent No.: US 9,621,438 B2
(45) Date of Patent: Apr. 11, 2017

(54) NETWORK TRAFFIC MANAGEMENT (71) Applicant: Accenture Global Services Limited, Dublin (IE)

(72) Inventor: Donatello Gassi, Antibes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 253 days.

(21) Appl. No.: 14/515,759

(22) Filed: Oct. 16, 2014

(65) Prior Publication Data

US 2015/0109915 A1  Apr. 23, 2015

(30) Foreign Application Priority Data

Oct. 21, 2013  (EP) .................................... 13290260

(51) Int. Cl.
| H04L 12/24 | (2006.01) |
| H04L 12/26 | (2006.01) |
| H04M 3/22 | (2006.01) |
| H04L 29/08 | (2006.01) |
| H04L 12/917 | (2013.01) |

(52) U.S. Cl.
CPC ...... H04L 41/5012 (2013.01); H04L 43/0882 (2013.01); H04L 43/16 (2013.01); H04L 47/76 (2013.01); H04L 67/12 (2013.01); H04M 3/2263 (2013.01)

(58) Field of Classification Search
CPC .......................... H04L 41/5012; H04L 43/0882
See application file for complete search history.

(56) References Cited

U.S. PATENT DOCUMENTS

| 7,024,203 | B1 * | 4/2006 | Naghian | ............... H04W 28/18 |
| | | | | 455/436 |
| 8,190,593 | B1 * | 5/2012 | Dean | ................. G06F 17/30864 |
| | | | | 707/707 |
| 2004/0139037 | A1 * | 7/2004 | Paleologo | .............. G06Q 50/06 |
| | | | | 705/412 |
| 2009/0161543 | A1 | 6/2009 | Beadle | |

(Continued)

FOREIGN PATENT DOCUMENTS

EP  2323314  5/2011

OTHER PUBLICATIONS

"European Search Report" for Application No. 13290260.2, European Patent Office, dated Jan. 22, 2014, 5 pages.

*Primary Examiner* — Robert Morlan
*Assistant Examiner* — Nourali Mansoury
(74) *Attorney, Agent, or Firm* — Mannava & Kang, P.C.

(57) ABSTRACT

In an aspect, the present application is directed to managing traffic in a network. A capacity request is received, wherein the capacity request comprises a request for capacity on the network. The capacity request is evaluated to determine whether the capacity requested by the capacity request in view of a measure of currently in-use network capacity on the network would exceed a threshold level. If the threshold level would not be exceeded, the capacity request is fulfilled so that a corresponding network request can be granted for transmission over the network; and if the threshold level would be exceeded, retrieving and analyzing real-time capacity data to determine an available network capacity of the network to be compared to the capacity requested in the capacity request.

13 Claims, 3 Drawing Sheets (56) References Cited

U.S. PATENT DOCUMENTS

| | | | |
|---|---|---|---|
| 2011/0314145 A1* | 12/2011 | Raleigh | H04L 41/0893 709/224 |
| 2012/0120800 A1* | 5/2012 | Lientz | H04W 28/0231 370/235 |
| 2012/0158533 A1* | 6/2012 | Purohit | G06Q 30/08 705/26.2 |
| 2012/0213518 A1 | 8/2012 | Tamai et al. | |
| 2012/0221955 A1* | 8/2012 | Raleigh | H04M 15/00 715/736 |
| 2014/0153422 A1* | 6/2014 | Nambiar | H04L 47/28 370/252 |
| 2015/0109910 A1* | 4/2015 | Hurd | H04W 28/0242 370/230 |

\* cited by examiner

NETWORK TRAFFIC MANAGEMENT

PRIORITY

This application claims foreign priority to European Application Serial Number 13290260.2, filed Oct. 21, 2013, entitled "COMPUTER-IMPLEMENTED METHOD, COMPUTER SYSTEM, COMPUTER PROGRAM PRODUCT TO MANAGE TRAFFIC IN A NETWORK", which is incorporated by reference in its entirety.

TECHNICAL FIELD

The description is directed generally to networks such as telecommunication networks and/or machine to machine (M2M) networks, particularly to traffic management for such networks to optimize the network capacity and, in particular, to a computer-implemented method, a computer system, and a computer program product to manage traffic in a network.

BACKGROUND

In a network, collections of nodes, links and any intermediate nodes are connected via links of the network so as to enable telecommunication (also referred to as communication) between them. This communication between nodes in a network is commonly referred to as network traffic or traffic. The links connecting the nodes together can be wireless or wired, and the nodes use circuit switching, message switching, and/or packet switching to pass data and/or signals through the correct links and nodes to reach the correct destination node. Each node in a network usually has a unique address so messages can be routed to the correct recipient node(s).

Links between the nodes in a network may define a (communication) channel between the nodes. A channel may be also referred to as a band and can be described by its bandwidth, or capacity for traffic. The nodes may be any kind of (technical/electronic) devices and/or (computer) systems.

Examples of networks are telecommunication networks such as computer networks, the Internet, the telephone network, and the global Telex network.

Other examples of networks are machine to machine (M2M) networks. M2M refers to technologies that allow wireless, wired, and hybrid (i.e. both wired and wireless) systems to communicate with each other. M2M communication can be a one-to-one connection (such as a remote network of machines relaying information back to a central hub for processing which would be rerouted into a computer system such as a PC) or a system of networks that transmits data to personal appliances. M2M networks have in the past been used for automation and instrumentation but are nowadays more commonly used in telematics applications. Indeed, M2M has numerous applications. For example, wireless M2M networks that are all interconnected can serve to improve production and efficiency in various areas such as machinery that works on building cars and/or on letting the developers of products know when those products need to be taken in for maintenance and/or for other reasons, such as reporting performance indications. Another exemplary application is to use wireless M2M technology to monitor systems such as utility meters. A further exemplary application is to use wireless M2M networks to update billboards. And, as noted above, telematics and in-vehicle entertainment is also an area of focus for M2M developers.

Traffic management systems are used to control and/or manage traffic in networks, particularly when available network capacity is limited, so that performance of the network can be optimized. Traffic management system can be thus used, for instance, to minimize the impact of peak usage in terms of failed connections between nodes in a network and/or across different networks and/or the quality of service of a network. Quality of service refers to several related aspects of (telephony and/or computer) networks that prioritize the transport of traffic with specific requirements, such as voice traffic. Network capacity relates to the maximum capacity of one or more channels of the network to transmit data from one node in the network to another node in the network. Traffic management systems can be used to optimize the network capacity of a network for performance tuning particularity with regard to bandwidth. Network capacity can be based on the channel capacity of each of the channels in the network and the channel capacity may define the tightest upper bound on the rate of data that can be reliably transmitted over a channel.

Capacity management as performed by a traffic management system is a process used to manage network capacity to meet current and future requirements in an effective manner. Since the usage of nodes and/or channels in the network change even over short periods of time and, over longer periods, node functionality evolves as the amount of processing power, memory, bandwidth need, etc. changes. If there are spikes in, for example, bandwidth need at a particular time, there must be processes in place to analyze what is happening at that time and makes changes to the traffic distribution to maximize available network capacity.

In traffic management systems that are used to control traffic on networks where available network capacity is limited, control decisions are made in real-time based on data about network traffic that is gathered in real-time. Such traffic management systems require a model of the network capacity also referred to as a capacity model, a model of the network congestion scenarios (network congestion can occur when a channel an/or a node of the network is carrying so much data that its quality of service deteriorates), the ability to control network access as performed by a traffic controller, and the ability to measure current network utilization in real-time. A capacity model can define capacity of a network and can specify a maximum number of radio frequencies in the network, a maximum number of active circuits in the network, a maximum number of concurrent sessions in the network, and/or a maximum allowed bandwidth of the network.

As a consequence of needing to be able to gather network information in real-time, currently available traffic management systems are complex. This is due to the need to retrieve real time data from a large number of channels and/or devices of the network and to use such real-time data to calculate the currently (i.e. at a given point in time) available network capacity. Such calculations require constantly probing the network and real time data elaboration. In other words, current traffic management systems are required to retrieve real time data from a large number of network channels and/or nodes to determine a current network capacity. Consequently, currently available traffic management systems can be inefficient (regarding processing time and/or memory, computing resources), and expensive.

Hence, there is a need to provide systems and methods for addressing the above problems to provide traffic management for networks with enhanced performance (regarding processing time/memory, computing resources, bandwidth use) which only require access to real time data according in specific conditions only (this can be also referred to as a "just-in-time" analysis) to reduce the amount of real-time data and real-time analysis required so as to be less complex and also cheaper compared to currently available traffic management systems and methods.

SUMMARY

According to one general aspect a computer-implemented method to manage traffic in a network is provided. The method comprises: receiving a capacity request from a node on the network, wherein the capacity request comprises a request for capacity on the network; evaluating whether the capacity requested with the capacity request in view of a measure currently in-use network capacity on the network would exceed a threshold level; if the threshold level would not be exceeded, the capacity request is fulfilled so that a corresponding network request can be granted for transmission over the network; and if the threshold level would be exceeded, retrieving and analyzing real-time capacity data to determine an available network capacity of the network to be compared to the capacity requested in the capacity request.

The capacity request requesting network capacity to process a corresponding network request on the network can be evaluated using standard analytical tools to retrieve statistical data on the requested capacity. The statistical data can comprise a bandwidth need to process the network request, estimated parameters required for processing the network request, and/or an average time required for processing the network request.

The threshold level determines an optimal network capacity for the network, and is computed by applying s service level estimation model (such as the, newsvendor model, which is described further herein) to the statistical data corresponding to the capacity request. The measure of currently in-use network capacity of the network can be estimated using a capacity model for the network, which can be a standard model for modeling network capacity.

The method manages and/or controls traffic (such as communication) in a network (e.g. a telecommunication network, a M2M network) to optimize the network capacity, in particular, where available capacity of the network is limited. This allows for minimizing the impact of peak usage in terms of failed connections between nodes in the network and/or between a node form a different network connecting to a node in said network and/or for quality of service of the network.

The method optimizes the network's capacity including channel capacity and/or node capacity. The method enables optimization of network capacity without requiring constantly probing the network and real time data elaboration. In other words, constant retrieval of real time data from a large number of network channels and/or nodes to determine a current network capacity is avoided. In this way, network traffic is reduced and performance (regarding processing time/memory, computing resources, bandwidth use) of the network is improved. Further, processing capacity requests is performance tuned since a just-in-time analysis is performed using the service level estimation model to determine the threshold level for the capacity request. This reduces the amount of real-time data and real-time analysis required so as to be less complex and also cheaper compared to currently available traffic management systems and methods.

Preferably, the threshold level corresponds to a confidence level that network capacity will not be exceeded.

Preferably, evaluating whether the capacity requested with the capacity request in view of the measure of currently in-use network capacity on the network would exceed a threshold level is performed by applying a service level estimation model to the capacity requested with the capacity request and the measure of currently in-use network capacity on the network.

Preferably, the service level estimation model is used to determine the threshold value by applying the capacity requested in the capacity request and the measure of currently in-use network capacity of the network to the service level estimation model. Using the service level estimation model, one or more or all of the following data (or data values) retrieved and/or derived from the capacity request and/or the current in-use capacity of the network can be evaluated using the service level estimation model: an average utilization time for a capacity unit (e.g. a node of the network)=T and/or a standard deviation of the utilization time of a capacity unit=$\sigma$. An input parameter which is also referred to as a confidence factor or confidential level "k" is utilized. "k" relates to the service level (called a), i.e. the probability that an actual capacity utilization time will not exceed T+k*$\sigma$. Under the assumption of normal distribution, a service level of: 95% K→1.64, 99% K→2.32, 99.9% K→3.09.

Preferably, the service level estimation model is an implementation of a newsvendor model.

Preferably, the network is a telecommunication network.

Preferably, the network is a machine to machine network.

According to another general aspect, a computer system to manage traffic in a network (also referred to as a traffic management system herein) is provided. The system comprises: a request interface (or a network interface) operable to receive a capacity request, wherein the capacity request comprises a request for capacity on the network; and an analytics engine operable to evaluate whether the capacity requested with the capacity request in view of a measure of currently in-use network capacity on the network would exceed a threshold level. If the threshold level would not be exceeded, the capacity request is fulfilled so that a corresponding network request can be granted for transmission over the network. If the threshold level would be exceeded, a real-time data regarding the network capacity is retrieved and analyzed to determine an available network capacity of the network. The available network capacity is compared to the capacity requested in the capacity request.

Preferably, the system is operable to implement any of the defined methods.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

The present application generally describes computing and network technologies for the management of the network capacity of a network. A network comprises collections of nodes, links (also referred to as channels) and any intermediate nodes which can connect via links of the network to establish link connections so as to enable telecommunication (also referred to as communication) between the nodes.

Preferably, the network is a telecommunication network. Preferably, the network is a M2M network, and further preferably a narrowband M2M network. Narrowband describes a channel in which the bandwidth of a message communicated between nodes in the network does not significantly exceed the channel's coherence bandwidth.

New systems and methods are described to manage and/or to control traffic in networks, in particular, where an available network capacity is limited. The described traffic management systems and methods can be used to minimize the impact of peak usage in terms of failed link connections between nodes in a network and/or across different networks and/or the quality of service of a network. Therefore, the described traffic management systems and methods can be used to optimize the network capacity of a network for performance tuning particularity with regard to bandwidth.

Network capacity relates to the maximum capacity of one or more channels of the network to transmit data from one node in the network to another node in the network. Traffic management systems can be thus used to optimize the network capacity of a network for performance tuning particularity with regard to bandwidth. Network capacity can be based on the channel capacity of each of the channels in the network. Channel capacity may define the tightest upper bound on the rate of data that can be reliably transmitted over a channel.

The present application aims to minimize failed link connections in a network and maximizing quality of service of a network. In other words, the present application aims at an optimized network capacity of a network. The traffic management systems and methods as described herein achieve this aim by reducing retrieval of real time data and processing of real time data in order to determine a network capacity for a capacity request. Network capacity, preferably optimized network capacity, is computed (or determined) by evaluating whether a request for a capacity of a network (also referred to herein as a capacity request) does not exceed a threshold level. A capacity request can be sent from a node within or outside a network before sending a corresponding data and/or processing request itself in order to determine whether the network has capacity to process the request. The threshold level is set based on a confidential level that the network capacity will not be exceed. For example, assuming a maximum capacity of "M" in a specific network node,
an average utilization time for a capacity unit (e.g. a resource in a node or a node of the network)=T,
standard deviation of the utilization time of a capacity unit=$\sigma$,
$\alpha$ being the service level,
a confidence level "k",
T-Count=number of capacity requests taken place in the interval: T+k*$\sigma$ (which relates to the probability that an actual capacity utilization time will not exceed this value T-count with a service level $\alpha$; T-Count is therefore referred to as the threshold level and shall not exceed M).

Assuming that n is the number of capacity requests for a given node of the network received in the preceding time equal to the threshold level T-Count. If n is equal to M, potentially the capacity has been fully utilized and before fulfilling any additional request, a traffic controller (preferably in interaction with a real-time data retriever) will have to retrieve real time data of the (current) utilization of said node in order to avoid oversubscription.

The optimal service level estimation is based on a heuristic model for approximating an optimal inventory in a supply chain also known as the "newsvendor model".

The traffic management systems and methods operate on estimated and/or predictive data regarding a capacity request (also referred to as statistical data of a capacity request) and the service level estimation model. The statistical data of the capacity request can be derived from periodic data analysis of completed network activity. The statistical data of the capacity request to be estimated include an average utilization time for a capacity unit (e.g. a resource of a node, a node in the network)=T, and/or a standard deviation of the utilization time of a capacity unit=$\sigma$. Said statistical data can be related to global averages such as on call network nodes and/or can be specialized such as per network node and/or per request (type).

The service level estimation model is applied to the statistical data of the capacity request in view of the threshold level to manage the vast majority of network requests and/or to thereby minimize (or at least reduce) the amount of real-time data retrieval and real-time data analysis needed to operate the network with optimized network capacity.

Figure 1:
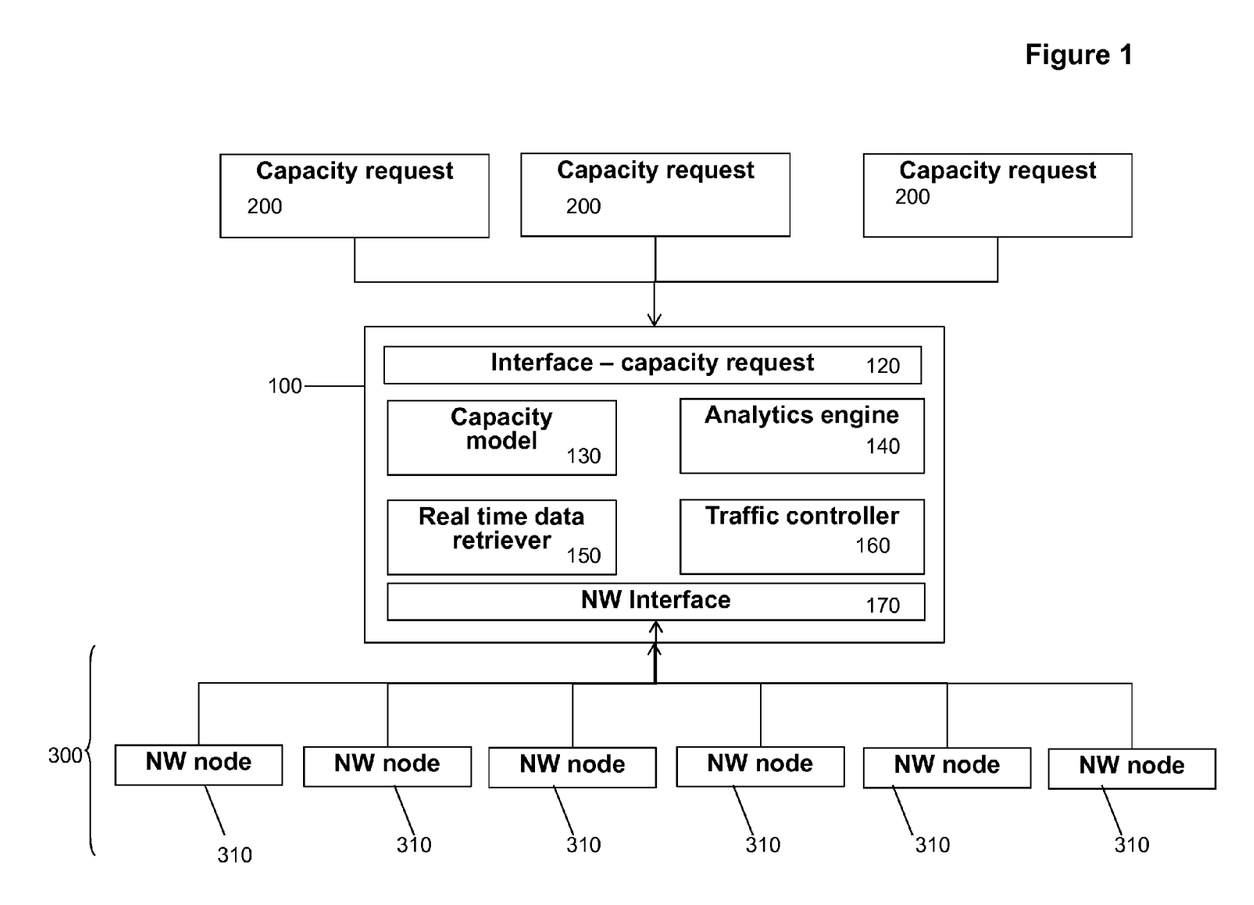
FIG. 1 shows an exemplary network implemented with a traffic management system and method.

FIG. 1 shows a traffic management system 100 implementing a corresponding traffic management method for management and/or control of a network 300 such as a telecommunication network or a M2M network. The network 300 comprises a plurality of nodes 310 (also referred to as network nodes 310). The traffic management system 100 is connected to the network 300. The traffic management system is also operable to retrieve one or more capacity requests 200 requesting capacity of the network for a corresponding network request. The network request relates to a request for data and/or data processing within the network 300. A capacity request 200 can be retrieved from a node 310 of the network 300 and/or from a node outside the network 300. A capacity request 200 can be specified for example via a web service, a JMS message, or similar request, and comprises data regarding a network request including data and/or information needed to retrieve the information on the one or more nodes involved in the capacity request. A capacity request 200 thus involves traffic in the network 300.

The traffic management system 100 processes a capacity request 200 to determine whether the capacity request 200 is fulfilled so that the corresponding network request can be processed in the network 300. For this purpose, the traffic management system 100 analyzes the capacity request 200 in view of an available capacity of the network 300, preferably at a given point in time and/or during a given period of time to retrieve statistical data with regard to the capacity request 200. An available capacity of the network 300 can be estimated and/or determined through evaluation of a capacity model 130 and/or past and/or current traffic in the network 300. The statistical data of the capacity request 200 is then used in a service level estimation model 110 to determine whether a threshold level is met. The service level estimation model 110 is described in detail below with reference to FIG. 2.

To implement the above computations, the traffic management system 100 can comprises a request interface 120, a capacity model 130, an analytics engine 140, a real time data retriever 150, a traffic controller 160, and/or a node interface 170.

The traffic management system is also operable to retrieve and/or to intercept one or more capacity requests 200 requesting capacity of the network for a corresponding network 300 request at the request interface 120. The interface 120 is operable to accept incoming a capacity request 200. In case of available capacity in the network 300, a positive acknowledgement message is sent to the requestor of the capacity request 200. In case of unavailable capacity with regard to the capacity request 200, a negative response message is sent to the requestor of the capacity request 200.

The traffic management system 100 is operable to connect to nodes 310 of the network 300 through the node interface 170. The node interface 170 is operable to receive data and/or information regarding the real time status of the capacity utilization of nodes 310 and/or to terminate/abort in real time the status of existing connections between nodes 310 in the network 300.

The capacity model 130 is a standard model specifying capacity of the network 300. The capacity model 130 can be based on predictive data analytics of the network 300. Using the capacity model 130, the estimation of currently utilized resources in at least one node 310, can be performed by the following computation: The number of utilized capacity units in time T0 is equal to the number of requests received in the interval (T0–T-Count, T0).

The real time data retriever 150 is a standard network component operable to retrieve real time data regarding the network 300 including channels and nodes in the network 300. The real time data retriever 150 is operable to utilize the node interface 170 to retrieve real time data and/or information of the status with regard to a capacity request 200 in a given node 310 in the network 300.

The traffic controller 160 is a standard network component operable to control network activities in the network 300, preferably regarding past and/or current traffic in the network 300. The traffic controller 160 may also be operable to coordinate allocation and/or deallocation of nodes 310 in the network 300 in response to a network request. For a capacity request 200 received at the traffic management system 100, the traffic controller 160 is operable to perform the following operations: Estimate by accessing the capacity model 130, if capacity according to the capacity request 200 is (probably) available. If based on the analysis of the capacity model 130 capacity for the capacity request 200 is available, the traffic controller 160 sends a positive acknowledgement message via the capacity interface 120 to the requestor of the capacity request 200. The corresponding request can be then processed in the network 300.

If based on the analysis of the capacity model 130 capacity for the capacity request 200 is not available, the traffic controller 160 sends a negative response message via the capacity interface 120 to the requestor of the capacity request 200. In this case, the traffic controller 160 further interacts with the real time data retriever 150 to retrieve real time data in order to check a real time status of the network 300 with regard to the capacity. Preferably, if based on the analysis of the capacity model 130 capacity for the capacity request 200 is not available and if the request 200 has normal priority, the traffic controller 160 sends a negative response message via the capacity interface 120 to the requestor of the capacity request 200. if based on the analysis of the capacity model 130 capacity for the capacity request 200 is not available and if the request 200 has a high priority, the traffic controller 160 holds in abeyance or aborts an existing capacity request 200 and sends a positive acknowledgement message via the capacity interface 120 to the requestor of the capacity request 200.

The analytics engine 140 is operable to process capacity requests 200 retrieved at the traffic management system 100. The analytics engine 140 may use for this processing the capability model 130, the service level estimation model 130, the real time data retriever 150, and/or the traffic controller 160. The analytics engine 140 can be operable to determine the statistical data for the capacity request 200 including [please give a specification of said statistics] and/or to determine, using the service level estimation model 110 applied to the statistical data of the capacity request 200 whether a threshold level is met or not.

Regarding the statistical data of the capacity request 200, the analytics engine 140 can be operable to compute an average time for the received capacity request 200 to be fulfilled. The average time for a capacity request 200 can be periodically re-evaluated by utilizing clustering to segment retrieved capacity requests 110 and estimating segmented utilization averages, with a segmentation, for example per node type, per incoming request type, per time of the day.

Using the analytics engine 140 and/or a combination of one or more of the components 120, 130, 140, 150, 160, 170, the traffic management system 100 is operable to evaluate whether a capacity request 200 is fulfilled by the network 300 or not. Whether the capacity request 200 is fulfilled or not can be determined by evaluating whether the capacity requested with the capacity request in view of a current in-use network capacity of the network 300 exceeds a threshold level regarding the network capacity or not. The current (at a given point in time) in-use network capacity of the network 300 preferably "results from an evaluation of the capacity model 130. The threshold level is determined using the service level estimation model 110 applied to the statistical data of the capacity request and/or the current in-use network capacity of the network 300.

The components 120, 130, 140, 150, 160, 170 of the traffic management system 100 can be also implemented in a single component forming the traffic management 100 itself and/or further other components having the functionality described herein.

A capacity request 200 is received and/or intercepted at the traffic management system 100. The traffic management system 100 processes and/or evaluates the capacity request 200 to predict, to estimate and/or to approximate statistical data regarding a corresponding network request for which capacity is requested with the capacity request 200 including how much bandwidth is needed, parameters required, and/or an average time for processing the corresponding network request in the network 300. The average time for processing are periodically re-evaluated based on completed network activity in the network 300 over a predetermined time period (e.g. on a daily basis).

The traffic management system 100 evaluates the statistical data of the capacity request 200 in view of a current in-use network capacity of the network 300 as determined using the capacity model 130 by applying the corresponding data to the service level estimation model 110 in order to evaluate and/or determine whether the capacity request 200 in view of the current in-use capacity of the network 300 would exceed a threshold level or not. In other words, the statistical data regarding the capacity request 200 and the current in-use capacity of the network 300 regarding the capacity model 130 are evaluated to retrieve a result. For example, data being evaluated may comprise an average capacity utilization duration in the network 300 over a predetermined period of time and its standard deviation. The result can be a value which can be compared to the threshold level. The threshold level is preferably based on a confidence level that network capacity of the network 300 will not be exceeded.

If according to a result of the evaluation, using the statistical data of the capacity request 300 and the service level estimation model 110, the network capacity is (substantially) optimal, preferably if the threshold level would not be exceeded, the capacity request 200 is fulfilled and the corresponding network request can be processed in the network 300. Else, the capacity request 200 is delayed and the traffic management system 100 retrieves real time data (preferably by triggering the real time data retriever 150 accordingly) on the available capacity in the specific one or more nodes 310 of the network 300 according to the capacity request 200. In other words, in this case, the traffic management system 100 probes real time data to determine available capacity in the specific nodes 310 according to the capacity request 200. The capacity request 200 is then fulfilled, aborted, or held in abeyance based on the retrieved effective capacity data (e.g. the real time data retrieved).

Figure 2:
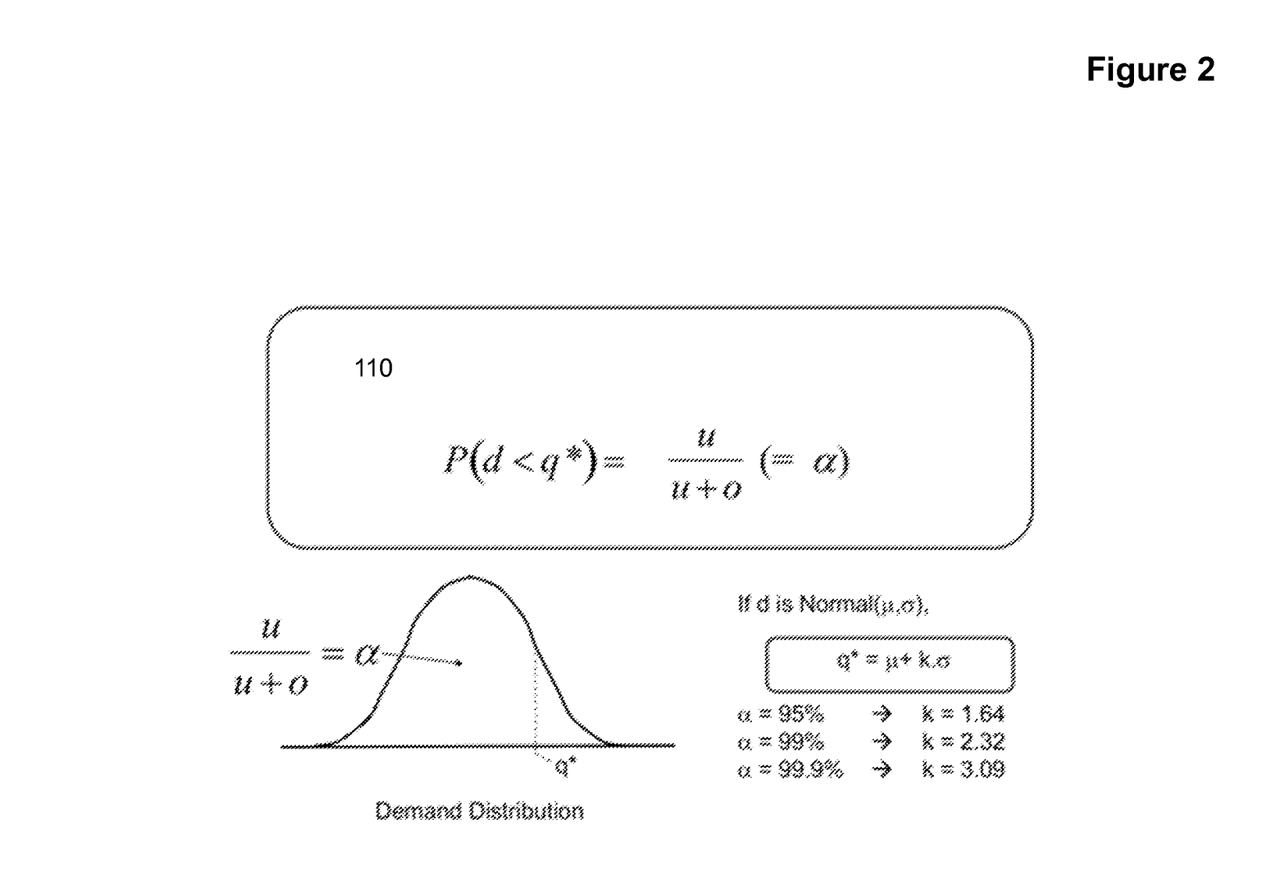
FIG. 2 shows an exemplary service level estimation model which can be implemented with the traffic management system and method of figure.

FIG. 2 shows a service level estimation model 110 which can be implemented with the traffic management system 100 as shown in FIG. 1 to determine a (available) network capacity of the network 300 with regard to statistical data of a capacity request 200 in view of a current in-use capacity of the network 300.

The service level estimation model 110 is an implementation of the news vendor model, which, as explained above, is a mathematical model used in operations management and applied economics used to determine optimal inventory levels. The newsvendor model defines the complex mathematical problem that can be described by analogy with the situation faced by a newspaper vendor how must decide how many copies of the day's paper to stock in the face of uncertain demand knowing that unsold copies with be worthless at the end of the day. A unique aspect of the implementation of the news vendor model in this context is that network capacity is not traditionally viewed as akin to physical inventory; application of the model as suggested herein however permits available network capacity to be estimated in a way that does not require a constant stream of real-time data.

Applying the newsvendor model in terms of the service level estimation model 110, the model 110 is used to determine optimal threshold levels for an optimal network capacity by applying the model 110 to the statistical data obtained by evaluation of a capacity request 200 and a capacity model 130 of a network 300 to which the request 200 is directed. A threshold level is based on a confidence level that the network capacity of a network 300 will not be exceeded.

In other words, the service level estimation model 110 is used to estimate an available network capacity of a network 300 at a given point in time to determine whether a capacity request 200 to the network 300 is fulfilled. A threshold level for the available network capacity is estimated. The threshold level is set based on a confidence level that network capacity will not be exceeded.

To be applied to evaluate optimal network capacity of a network 300, in the service level estimation model 110 the used variables are defined as follows:
a maximum capacity of "M" in a specific network node,
an average utilization time for a capacity unit (e.g. a resource in a node or a node of the network)=T,
standard deviation of the utilization time of a capacity unit=$\sigma$,
$\alpha$ being the service level,
a confidence level "k",
T-Count=number of capacity requests taken place in the interval: $T+k*\sigma$ (which relates to the probability that an actual capacity utilization time will not exceed this value T-count with a service level $\alpha$; T-Count is therefore referred to as the threshold level and shall not exceed M).

Assuming that n is the number of capacity requests for a given node of the network received in the preceding time equal to the threshold level T-Count. If n is equal to M, potentially the capacity has been fully utilized and before fulfilling any additional request, a traffic controller (preferably in interaction with a real-time data retriever) will have to retrieve real time data of the (current) utilization of said node in order to avoid oversubscription.

Figure 3:
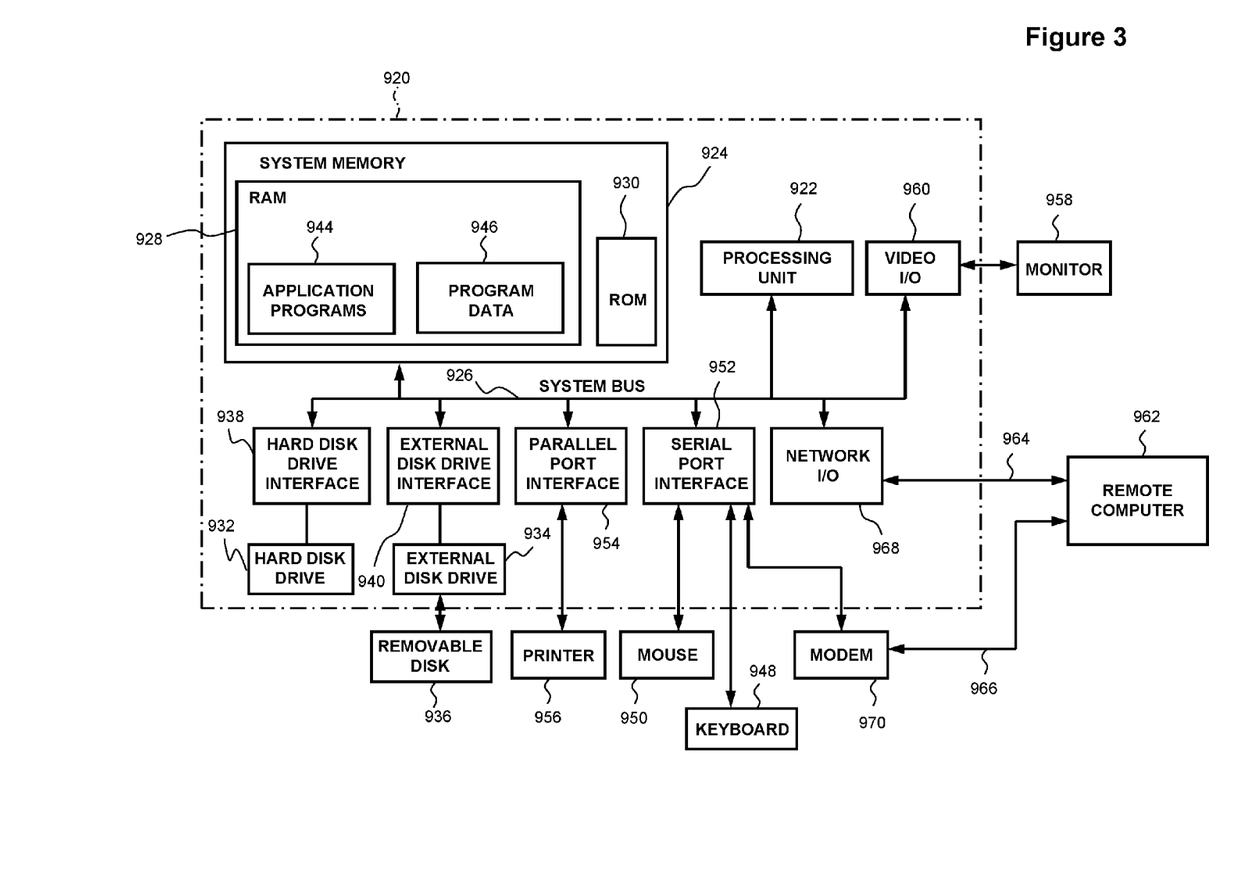
FIG. 3 shows an exemplary computer system for implementing methods and systems as shown in FIGS. 1 and 2.

The service level $\alpha$ can be evaluated using the newsvendor model as shown in FIG. 2:
u=is the unfulfilled capacity request
o=is the cost of unused capacity, this is preferably evaluated using the cost real time capacity check FIG. 3 shows an exemplary system for implementing the invention including a general purpose computing device in the form of a computing device 920. As examples, computing device 920 may take the form of a desktop computer, a server computer, a network router, a network switch, or other telecommunications device. In some implementations, device 920 may include one or more devices 920 each including one or more components of a device 920. The device 920 may perform one or more processes described herein.

The computing device 920 includes a processor 922, a system memory 924, and a system bus 926. The system bus couples various system components including the system memory 924 to the processor 922. The processor 922 may perform arithmetic, logic and/or control operations by accessing the system memory 924. The system memory 924 may store information and/or instructions for use in combination with the processor 922. Processor 922 may include a processor (e.g., a central processing unit, a graphics processing unit, an accelerated processing unit), a microprocessor, or a similar processing component that interprets and/or executes instructions. The system memory 924 may include volatile and non-volatile memory, such as a random access memory (RAM) 928 and a read only memory (ROM) 930. A basic input/output system (BIOS) containing the basic routines that helps to transfer information between elements within the computing device 920, such as during start-up, may be stored in the ROM 930. The system bus 926 may be any of several types of bus structures including a memory bus or memory controller, a peripheral bus, and a local bus using any of a variety of bus architectures.

Computing device 920 may further include a hard disk drive 932 for reading from and writing to a hard disk (not shown), and an external disk drive 934 for reading from or writing to a removable disk 936. The removable disk 936 may be a magnetic disk for a magnetic disk drive or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the computing device 920. The data structures may include relevant data for the implementation of the method for providing a femtocell-based infrastructure for mobile electronic payment, as described above. The relevant data may be organized in a database, for example a relational database management system or an object-oriented database management system.

Although the exemplary computing device 920 described herein employs a hard disk (not shown) and an external disk 936, it should be appreciated by those skilled in the art that other types of computer readable media which can store data that is accessible by a computer, such as magnetic cassettes, solid state (i.e. flash) memory, digital video disks, random access memories, read only memories, and the like, may also be used in the exemplary operating environment.

Computing device 920 may perform one or more of the processes described herein, and/or it may perform these processes in response to processor 922 executing software instructions included in a computer-readable medium, such as RAM 928, ROM 930, hard disk drive 932, removable disk 936, or other non-transitory memory device. Such a memory device may include memory space within a single physical storage device or memory space spread across multiple physical storage devices. More specifically, a number of program modules may be stored on the hard disk drive 932, removable disk 936, ROM 930 or RAM 928, including an operating system (not shown), one or more application programs 944, other program modules (not shown), and program data 946. The application programs may include at least a part of the functionality as depicted in FIGS. 1 and 2. In some implementations, one or more aspects of the system 100 depicted FIG. 1 may be performed by computing device 920. In some implementations, one or more aspects of the system 100 depicted in FIG. 1 may be performed by another computing device or a group of computing devices separate from or including computing device 920.

A user may enter commands and information, as discussed below, into the computing device 920 through input devices such as keyboard 948 and mouse 950. Other input devices (not shown) may include a microphone (or other sensors), joystick, game pad, scanner, or the like. These and other input devices may be connected to the processor 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processor 922 through parallel port interface 954. A monitor 958 or other type of display device is also connected to the system bus 926 via an interface, such as a video input/output 960. In addition to the monitor, computing device 920 may include other peripheral output devices (not shown), such as speakers or other audible output.

The computing device 920 may communicate with other electronic devices such as a computer, telephone (wired or wireless), personal digital assistant, television, or the like. To communicate, the computer device 920 may operate in an M2M networked environment using connections to one or more electronic devices. FIG. 3 depicts the computer environment networked with remote computer 962. The remote computer 962 may be another computing environment such as a server, a router, a network PC, a peer device or other common network node, and may include many or all of the elements described above relative to the computing device 920. The logical connections depicted in FIG. 3 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing device 920 may be connected to the LAN 964 through a network I/O 968. When used in a WAN networking environment, the computing device 920 may include a modem 970 or other means for establishing communications over the WAN 966. The modem 970, which may be internal or external to computing device 920, is connected to the system bus 926 via the serial port interface 952. In a networked environment, program modules depicted relative to the computing device 920, or portions thereof, may be stored in a remote memory storage device resident on or accessible to remote computer 962. Furthermore other data relevant to the method for managing traffic in a network (described above) may be resident on or accessible via the remote computer 962. It will be appreciated that the network connections shown are exemplary and other means of establishing a communications link between the electronic devices may be used.

The above-described computing device 920 is only one example of the type of computing device that may be used to implement the method for managing traffic in a network.

What is claimed is:

1. Computer-implemented method to manage traffic in a network, the method comprising:
    receiving, at a network interface, a capacity request, wherein the capacity request comprises a request for capacity on the network;
    evaluating, by at least one processor, whether the capacity requested by the capacity request in view of a measure of currently in-use network capacity on the network would exceed a threshold level, wherein evaluating whether the capacity requested with the capacity request in view of the measure of currently in-use network capacity on the network would exceed the threshold level is performed by applying a service level estimation model to the capacity requested with the capacity request and the measure of currently in-use network capacity on the network;

if the threshold level would not be exceeded, the capacity request is fulfilled so that a corresponding network request can be granted for transmission over the network; and if the threshold level would be exceeded, retrieving and analyzing real-time capacity data to determine an available network capacity of the network to be compared to the capacity requested in the capacity request.

2. The method according to claim 1, wherein the threshold level corresponds to a confidence level that network capacity of the network will not be exceeded.

3. The method according to claim 1, wherein the service level estimation model is used to determine the threshold level by applying the capacity requested in the capacity request and the measure of currently in-use network capacity of the network to the service level estimation model.

4. The method according to claim 1, wherein the service level estimation model is an implementation of a newsvendor model.

5. The method according to claim 1, wherein the network is a telecommunication network.

6. The method according to claim 1, wherein the network is a machine to machine network.

7. A non-transitory computer readable medium storing a computer program product comprising computer readable instructions, which when loaded and run in a computer system, causes one or more processors in the computer system to perform operations comprising:

receiving a capacity request, wherein the capacity request comprises a request for capacity on the network;

evaluating whether the capacity requested by the capacity request in view of a measure of currently in-use network capacity on the network would exceed a threshold level, wherein evaluating whether the capacity requested with the capacity request in view of the measure of currently in-use network capacity on the network would exceed the threshold level is performed by applying a service level estimation model to the capacity requested with the capacity request and the measure of currently in-use network capacity on the network;

if the threshold level would not be exceeded, the capacity request is fulfilled so that a corresponding network request can be granted for transmission over the network; and if the threshold level would be exceeded, retrieving and analyzing real-time capacity data to determine an available network capacity of the network to be compared to the capacity requested in the capacity request.

8. Computer system to manage traffic in a network, the system comprising:

a request interface operable to receive a capacity request, wherein the capacity request requests for capacity on the network; and an analytics engine, executed on one or more processors of the computer system, operable to evaluate whether the capacity requested with the capacity request in view of a measure of currently in-use network capacity on the network would exceed a threshold level, wherein evaluating whether the capacity requested with the capacity request in view of the measure of currently in-use network capacity on the network would exceed the threshold level is performed by applying a service level estimation model to the capacity requested with the capacity request and the measure of currently in-use network capacity on the network;

wherein if the threshold level would not be exceeded, the capacity request is fulfilled so that a corresponding network request can be granted for transmission over the network; and if the threshold level would be exceeded, a real time data retriever is operable to retrieve and analyzing real-time capacity data to determine an available network capacity of the network to be compared to the capacity requested in the capacity request.

9. The system according to claim 8, wherein the threshold level corresponds to a confidence level that network capacity of the network will not be exceeded.

10. The system according to claim 8, wherein the service level estimation model is used to determine the threshold level by applying the capacity requested in the capacity request and the measure of currently in-use network capacity of the network to the service level estimation model.

11. The system according to claim 8, wherein the service level estimation model is an implementation of a newsvendor model.

12. The system according to claim 8, wherein the network is a telecommunication network.

13. The system according to claim 8, wherein the network is a machine to machine network.

* * * * *

UNITED STATES PATENT AND TRADEMARK OFFICE
CERTIFICATE OF CORRECTION

| | |
|---|---|
| PATENT NO. | : 9,621,438 B2 |
| APPLICATION NO. | : 14/515759 |
| DATED | : April 11, 2017 |
| INVENTOR(S) | : Donatello Gassi |

It is certified that error appears in the above-identified patent and that said Letters Patent is hereby corrected as shown below:

On the Title Page

At Item (30), Foreign Application Priority Data "13290260" should be "13290260.2".

Signed and Sealed this
Seventh Day of August, 2018

Andrei Iancu
*Director of the United States Patent and Trademark Office*